United States Patent Office 3,833,588
Patented Sept. 3, 1974

---

3,833,588
UNSATURATED-SUBSTITUTED TRICYCLIC QUINAZOLINONES
Goetz E. Hardtmann, Florham Park, N.J., assignor to Sandoz-Wander, Inc., Hanover, N.J.
No Drawing. Continuation-in-part of abandoned application Ser. No. 247,435, Apr. 25, 1972. This application Mar. 2, 1973, Ser. No. 337,381
Int. Cl. C07d 51/48
U.S. Cl. 260—256.4 F                 17 Claims

ABSTRACT OF THE DISCLOSURE

The compounds are pharmacologically active tricyclic quinazolinones of the class of imidazo[2,1-b]quinazolin-5 - ones, pyrimido[2,1 - b]quinazolin - 6 - ones and diazepino[2,1 - b]quinazolin - 7 - ones, bearing an unsaturated substituent on the available nitrogen of the quinazolinone portion and useful, for example, as anti-inflammatory and bronchodilator agents. Processes for preparation of said compounds include the reaction of a N-carboxy-anthranilic anhydride (an isatoic anhydride) with a cyclic pseudothiourea such as 2 - organomercapto-4,5 - dihydroimidazole or 2 - organomercapto - 3,4,5,6-tetrahydropyrimidine.

---

This application is a continuation-in-part of copending application Ser. No. 247,435, filed Apr. 25, 1972, now abandoned.

The present invention relates to tricyclic compounds which are quinazolinones, and to their preparation. The invention also relates to pharmaceutical methods and compositions for utilization of the compounds based on their biological activity.

The compound 2,3 - dihydro - 10 - ethyl - imidazo-[2,1-b]quinazolin-5(10H)-one, and a method for preparing it, are known from Doleschall et al., Acta Chim. Hung. 45, 317–360 [1965]. The article contains no indication whatsover, however, that the compound possesses pharmacological activity. I have found as disclosed in U.S. Pat. 3,598,823, that said compound and the class of alkyl substituted compounds represented thereby possess pharmacological activity, in particular that they have bronchodilator activity.

The present invention provides pharmacologically active compounds of the formula I:

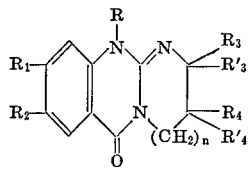

wherein each of $R_1$ and $R_2$ is, independently, hydrogen, halo of atomic weight not greater than 36 or lower alkyl of 1 to 3 carbon atoms, or are both lower alkoxy of 1 to 2 carbon atoms; or one is hydrogen and the other lower alkoxy of 1 to 2 carbon atoms,
$n$ is 0 to 2; and
R is alkenyl of 3 to 10 carbon atoms, e.g. allyl, methallyl, crotyl, hexene-5 and octene-7; alkynyl of 3 to 6 carbon atoms, e.g. propargyl; or cyanoalkyl of 2 to 6 carbon atoms, and
each of $R_3$, $R'_3$, $R_4$ and $R'_4$ is hydrogen or alkyl of 1 to 3 carbon atoms provided no more than 3 of $R_3$, $R'_3$, $R_4$ and $R'_4$ are alkyl, or a pharmaceutically acceptable acid addition salt thereof.

The generally preferred method for preparation of compounds of formula I involves reacting in a Step A a compound of the formula II:

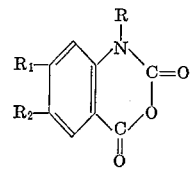

wherein $R_1$, $R_2$ and R are as defined, with a compound of formula III:

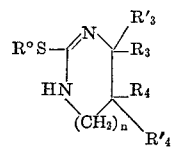

wherein $R_3$, $R'_3$, $R_4$, $R'_4$ and $n$ is as defined and R° is lower alkyl or benzyl.

The preparation of compounds I by Step A can be carried out at temperatures in the range of 20° C. to 160° C., more usually 20° C. to 140° C., preferably 80° C. to 120° C. The reaction is conveniently carried out in an organic solvent of conventional type providing an inert medium. The aromatic solvents and cyclic ethers suitable for use at reflux temperatures represent the preferred solvents, e.g. toluene and dioxane. The reaction is preferably carried out in the presence of a base, e.g. sodium hydroxide or sodium carbonate; and when the compound III is employed in acid addition salt form, it is of course desirable to employ an amount of base somewhat greater than the amount necessary to neutralize the acid. The reaction product of formula I may be recovered from the reaction of Step A by working up by conventional procedures.

The compounds of the formula III are known or may be prepared by known procedures while compounds II may be prepared from known material by established procedures involving reacting the corresponding N-unsubstituted isatoic anhydride with a strong base and the chloro or bromo derivative of the R substituent at suitably 0° C. to 80° C.

Also within the scope of the invention are pharmaceutically acceptable salts of the compounds I. Such salts include the acid addition salts of known type, e.g., the hydrochloride. The acid addition salts may be produced from the free bases by conventional procedures. Conversely, the free bases may be obtained from the salts by procedures known in the art.

The compounds of the formula I are useful as anti-inflammatory agents as indicated by an inhibition of Carrageenan, induced edema in rats on oral administration (15–150 mg./kg.). For such use, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. The dosage administered will, of course, vary depending upon the compound used and the mode of administration. However, in general, satisfactory results are obtained when administered at a daily dosage of from about 1.5 milligrams to about 150 milligrams per kilogram of body weight, preferably given in divided doses 2 to 4 times a day, or in sustained release form. For most mammals the administration of from about 100 milligrams to about 1600 milligrams of the compound per day provides satisfactory results and dosage forms suitable for internal administration comprise from about 25 milligrams to about 800 milligrams of the compound in admixture with a solid or liquid pharmaceutical carrier or diluent.

The compounds of the formula I are also useful as bronchodilator agents as indicated by observing the respiratory status on oral administration (1.0–100 mgs./kgs.) to the unanesthetized guinea pig exposed to aerosolized histamine dihydrochloride according to a modification of the method of Van Arman et al., J. Pharm. Pharmacol. 17: 374–385, 1960; and in vitro by observing the effect (0.1–30 micrograms/ml.) on strips of guinea pig trachea according to the method of Constantine, J. Pharm. Pharmacol. 17: 384–385, 1960. For such use and depending upon known variables satisfactory results are obtained in general on the daily administration of from 0.5 to 100 milligrams per kilogram of body weight, preferably given in divided doses 2 to 4 times a day, or in sustained release form. For most mammals the administration of from 40 to 1500 milligrams per day provides satisfactory results and dosage forms suitable for internal administration comprise 10 to 750 milligrams of the compound in admixture with a solid or liquid pharmaceutical carrier or diluent.

For the above usages, the compounds may be combined with a pharmaceutically acceptable carrier, and such other conventional adjuvants as may be necessary, and administered orally or parenterally. For must uses oral administration with carriers is preferred and may take place in such conventional forms as tablets, dispersible powders, granules, capsules, suspensions, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium phosphate, calcium sulphate, dihydrate, lactose and talc, granulating and disintegrating agents, e.g., starch and alginic acid, binding agents, e.g., starch, gelatin, polyvinylpyrrolidone and acacia, and lubricating agents, e.g. magnesium stearate, stearic acid and talc. The tablets may be uncoated or coated by known techniques to delay disintegration and adsorption in the gastrointestinal tract and thereby provide a sustained action over a long period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservative (ethyl-p-hydroxy-benzoate). Capsules may contain the active ingredient alone or admixed with an inert solid diluent, e.g., calcium carbonate, calcium phosphate and kaolin. The preferred pharmaceutical compositions from the standpoint of preparation and ease of administration are solid compositions, particularly hard-filled capsules and tablets. Parenteral administration may be in such conventional forms as injectionable solutions and suspensions.

A representative formulation is a tablet for oral administration 2 to 4 times a day for the treatment of inflammation or for prophylactic treatment of bronchial asthma and prepared by conventional tabletting techniques to contain the following ingredients:

| Ingredients | Weight (mg.) |
| --- | --- |
| 10-(5-hexenyl - 2,3 - dihydro-imidazo[2,1-b]quinazolin-5(10H)-one | 50 |
| Tragacanth | 10 |
| Lactose | 197.5 |
| Corn starch | 25 |
| Talcum | 15 |
| Magnesium stearate | 2.5 |

A representative formulation is also a capsule for oral administration 2 to 4 times a day for the treatment of inflammation or for prophylactic treatment of bronchial asthma and prepared by conventional capsulating techniques to contain the following ingredient:

| Capsule ingredients | Weight (mg.) |
| --- | --- |
| 10-(2-butenyl) - 2,3 - dihydro-imidazo[2,1-b]quinazolin-5(10H)-one | 50 |
| Lactose | 316 |
| Sterotex K (a triglyerol ester lubricant) | 20 |

In addition, the compounds of the formula I may be administered as bronchodilators by inhalation therapy in a conventional manner, e.g. by the use of nebulizers, vaporizers, aerosols and the like. Compositions for use in administration by inhalation therapy may be prepared accordingly to conventional procedures and contain the usual conventional ingredients employed in such compositions. A representative aerosol formulation prepared by conventional techniques for use with a metered value system contains the following ingredients:

| | Percent |
| --- | --- |
| 10-(5-hexenyl) - 2,3 - dihydroimidazo[2,1b]quinazolin-5(10H)-one | 0.4–20 |
| Ethyl alcohol | 10–40 |
| Ascorbic acid | 1–10 |
| Freon 11 | 10–30 |
| Freon 114 | 10–30 |
| Freon 12 | 30–60 |
| Buffer System—pH control, q.s. | |
| Flavor, q.s. | |

The following examples show representative compounds encompased within the scope of this invention and the manner in which such compounds are prepared. However, it is to be understood that the examples are for purposes of illustration only.

EXAMPLE 1

10-allyl-2,3-dihydro-imidazo[2,1-b]quinazolin-5(10H)one

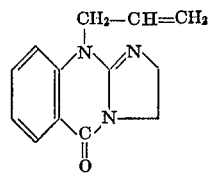

Step A.—Preparation of N-allyl-isatoic anhydride: To a solution of 30 g. of isatoic anhydride in 300 ml. of dimethylacetamide at room temperature is added, sodium hydride obtained by washing three times with pentane 9.0 g. of 57% suspension of sodium hydride in mineral oil. The resulting mixture is stirred for 1 hour at room temperature and 24 g. of allyl bromide is added followed by stirring at room temperature for about 1 hour. The resulting mixture is concentrated in vacuo to about one third its volume, a mixture of ice and water added and the resulting precipitate filtered off, washed with water, dried under reduced pressure at 35°C. The solid material is then dissolved in methylene chloride, dried with sodium sulfate, treated with charcoal and diethyl ether added to crystallize on evaporation in vacuo N-allyl-isatoic anhydride, m.p. 102–104° C.

Step B.—Preparation of 10-allyl-2,3-dihydro-imidazo-[2,1-b]quinazolin-5(10H)-one: A solution of 15 g. of N-allyl-isatoic anhydride, 2.5 g. of 2-methylmercapto-imidazoline and one pellet (about 100 mg.) sodium hydroxide in 300 ml. of dioxane is refluxed with stirring for 3 hours. The resulting mixture is evaporated to dryness, the residue dissolved in methylene chloride, and extracted twice with 2N hydrochloric acid. The combined aqueous extracts are washed with methylene chloride and then with diethyl ether and made basic with 2N sodium bicarbonate. The resulting precipitate is filtered off, washed thoroughly with water, dried under reduced pressure, dissolved in methylene chloride, dried with sodium sulfate, and the methylene chloride exchanged for diethyl ether to crystallize 10-allyl-2,3-dihydro-imidazo[2,1-b]quinazolin-5(10H)-one, m.p. 119–121° C.

EXAMPLE 2

The following compounds of the invention are prepared employing the reaction which is exemplified in Example 1.

(A) 10-(5-hexenyl)-2,3-dihydro-imidazo[2,1-b]quinazolin-5(10H)-one, m.p. 59–62° C.
(B) 10-propargyl-2,3-dihydro-imidazo[2,1-b]quinazolin-5(10H)-one, m.p. 19°–192° C.
(C) 12-allyl-2,3,4,5-tetrahydro(12H)-diazepino[2,1-b]quinazolin-7-one.
(D) 12-propargyl-2,3,4,5-tetrahydro-(12H)-diazepino-[2,1-b]quinazolin-7-one.
(E) 10-cyanomethyl-2,3-dihydro-imidazo[2,1-b]quinazolin-5(10H)-one, m.p. 259–262° C.
(F) 10-(2-butenyl)-2,3-dihydro-imidazo[2,1-b]quinazolin-5(10H)-one, m.p. 100–102° C.
(G) 10-(3-butenyl)-2,3-dihydro-imidazo[2,1-b]quinazolin-5(10H)-one, m.p. 96–98° C.
(H) 10-(4-pentenyl)-2,3-dihydro-imidazo[2,1-b]quinazolin-5(10H)-one, m.p. 125–127° C.
(I) 7-chloro-2,3-dihydro-10-allyl-imidazo[2,1-b]quinazolin-5(10H)-one.
(J) 10-(2-methallyl)-2,3-dihydro-imidazo[2,1-b]quinazolin-5(10H)-one, m.p. 143–145° C.
(K) 11-allyl-2,3,4,11-tetrahydropyrimido[2,1-b]quinazolin-5(10H)-one, m.p. 73–75° C.
(L) 10-(7-octenyl)-2,3-dihydro-imidazo[2,1-b]quinazolin-5(10H)-one.
(M) 10-(4-pentenyl)-7-chloro-2,3-dihydro-imidazo-[2,1-b]quinazolin-5(10H)-one, m.p. 73–76° C.
(N) 11-(4-pentenyl)-2,3,4,11-tetrahydropyrimido-[2,1-b]quinazolin-6-one, m.p. 95–98° C.
(O) 10-cyanomethyl-2,2-dimethyl-2,3-dihydro-imidazo-[2,1-b]quinazolin-5(10H)-one.
(P) 10-propargyl-2,2-dimethyl-2,3-dihydro-imidazo-[2,1-b]quinazolin-5(10H)-one, m.p. 127–129° C.
(Q) 10-(4-pentenyl)-2-methyl-2,3-dihydro-imidazo-[2,1-b]quinazolin-5(10H)-one, m.p. 104–107° C.
(R) 11-(4-pentenyl)-3,3-dimethyl-2,3,4,11-tetrahydropyrimido[2,1-b]quinazolin-6-one, m.p. 69–72° C.

What is claimed is:
1. A compound of the formula:

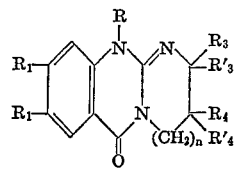

wherein each of $R_1$ and $R_2$ is, independently, hydrogen, halo of atomic weight not greater than 36 or alkyl of 1 to 3 carbon atoms, or are both alkoxy of 1 to 2 carbon atoms; or one is hydrogen and the other alkoxy of 1 to 2 carbon atoms, $n$ is 0 to 2; and R is alkenyl of 3 to 10 carbon atoms, alkynyl of 3 to 6 carbon atoms, or cyanoalkyl of 2 to 6 carbon atoms, and each of $R_3$, $R'_3$, $R_4$ and $R'_4$ is hydrogen or alkyl of 1 to 3 carbon atoms provided no more than 3 of $R_3$, $R'_3$, $R_4$ and $R'_4$ are alkyl, or a pharmaceutically acceptable acid addition salt thereof.

2. A compound of claim 1 in which R is alkenyl.
3. The compound of claim 2 which is 10-allyl-2,3-dihydro-imidazo[2,1-b]quinazolin-5(10H)-one.
4. The compound of claim 2 which is 10-(5-hexenyl)-2,3-dihydro-imidazo[2,1-b]quinazolin-5(10H)-one.
5. The compound of claim 2 which is 10-(2-butenyl)-2,3-dihydro-imidazo[2,1-b]quinazolin-5(10H)-one.
6. The compound of claim 2 which is 10-(3-butenyl)-2,3-dihydro-imidazo[2,1-b]quinazolin-5(10H)-one.
7. The compound of claim 2 which is 10-(2-methallyl)-2,3-dihydro-imidazo[2,1-b]quinazolin-5(10H)-one.
8. A compound of claim 1 in which R is alkynyl.
9. The compound of claim 8 which is 10-propargyl-2,3-dihydro-imidazo[2,1-b]quinazolin-5(10H)-one.
10. A compound of claim 1 in which R is cyanoalkyl.
11. The compound of claim 10 which is 10-cyanomethyl-2,3-dihydro-imidazo[2,1-b]quinazolin-5 - (10H)-one.
12. A compound of claim 1 in which each of $R_1$ and $R_2$ is hydrogen.
13. A compound of claim 1 in which $n$ is 0.
14. A compound of claim 1 in which $n$ is 1.
15. A compound of claim 1 in which each of $R_3$, $R'_3$, $R_4$ and $R'_4$ is hydrogen.
16. A compound of claim 1 in which either $R_3$ and $R'_3$ are both alkyl or $R_4$ and $R'_4$ are both alkyl.
17. A compound of claim 16 in which both $R_3$ and $R'_3$ are methyl.

References Cited
UNITED STATES PATENTS
3,598,823   8/1971   Hardtmann _____ 260—256.4

FOREIGN PATENTS
750,960   11/1970   Belgium.

RAYMOND V. RUSH, Primary Examiner

U.S. Cl. X.R.
260—244 A, 251 R; 424—251